June 22, 1965    J. M. GARIBOLDI    3,190,221
ROCKET STAGE COUPLING
Filed Dec. 27, 1961

INVENTOR.
JOHN M. GARIBOLDI
BY Ervin F. Johnston
George J. Rubens
ATTORNEYS

United States Patent Office 3,190,221
Patented June 22, 1965

3,190,221
ROCKET STAGE COUPLING
John M. Gariboldi, Oxnard, Calif., assignor to the United States of America as represented by the Secretary of the Navy
Filed Dec. 27, 1961, Ser. No. 162,621
10 Claims. (Cl. 102—49)
(Granted under Title 35, U.S. Code (1952), sec. 266)

The invention described herein may be manufactured and used by or for the Government of the United States of America for governmental purposes without the payment of any royalties thereon or therefor.

The present invention relates to a rocket stage coupling and more particularly to a coupling for joining a pair of rocket stages together so that a first stage can be fired with the stages in tandem and then the second stage fired causing the separation of the second stage from the first stage.

The 2.75 inch FFAR is a folding fin air rocket which is standardized with a predetermined length. This rocket is 2.75 inches in diameter and is used for air-to-air purposes. In order to conduct deeper probes into space, it has become necessary to acquire more booster force than that existing in the standardized FFAR. The present invention obtains this additional required booster force by coupling two or three of the FFAR's together. The coupling is constructed in such a way that upon firing a second rocket stage the thrust from the exhaust therefrom causes the second stage and a first fired adjacent stage to separate. The invention allows any number of FFAR's to be coupled together, the number being limited only by a practical limit for the thrust involved and aerodynamic considerations.

An object of the present invention is to provide a simple coupling between a pair of stages of a multi-stage rocket which utilizes the force of the exhaust of the second fired stage of the pair for separating the pair at a preselected time.

Another object is to provide a multi-stage missile having a simple means operated by the firing of one of the stages for separating the fired stage from an adjacent stage.

A further object is to provide a coupling for a multi-stage missile in which each stage has folding fins, the coupling joining a pair of the stages in tandem and retaining the fins of one of the stages in a folded condition until the latter stage is fired, at which time the coupling frees the fins and separates the pair of stages.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
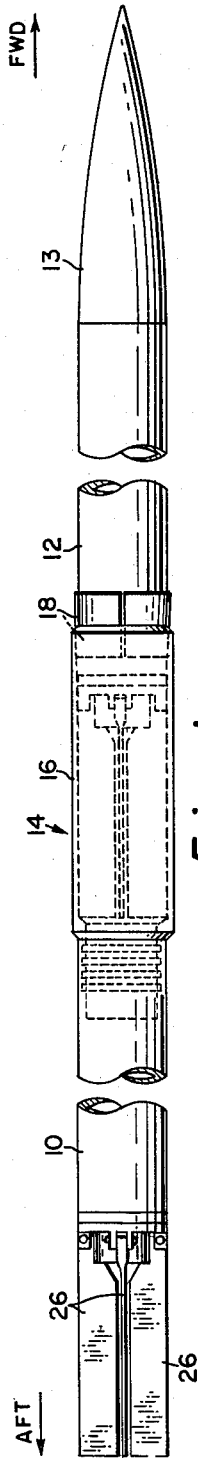
FIG. 1 shows a side view of the invention in its assembled condition.
Figure 2:
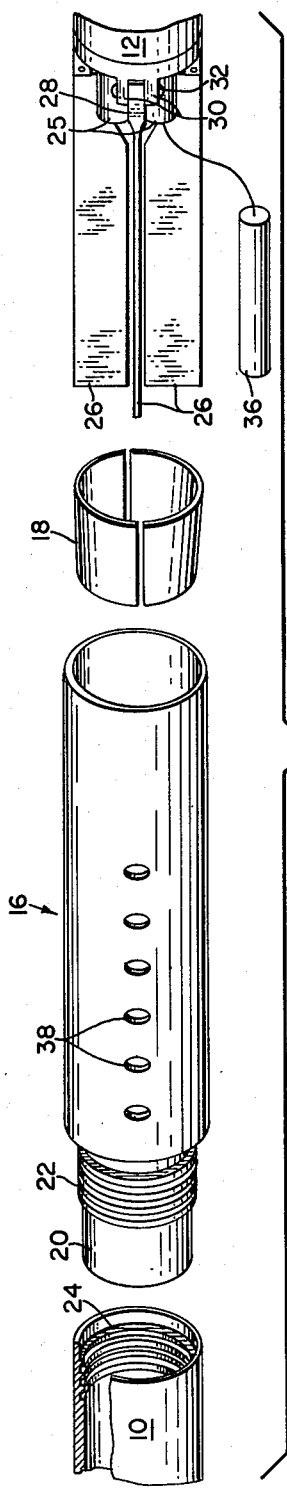
FIG. 2 is an exploded isometric view of the invention with a portion of each stage cut away.

Referring now to the drawings, wherein like reference numerals designate like or corresponding parts throughout the several views, there is shown in FIG. 1 a missile having a first fired stage 10, a second fired stage 12 and a nose 13, the order of the firing of the stages in this specification merely referring to one stage with respect to an adjacent stage so that in missiles having more than two stages the first fired stage would not necessarily be the initial fired stage thereof. The stages 10 and 12 are joined together by coupling 14, the coupling being a sleeve 16 and a split ring 18. As shown in FIG. 2, the sleeve at its aft end has a neck 20, the neck having external threads 22 which are adapted to screw into internal threads 24 in the stage 10. The rocket motor for each stage exhausts through four rocket nozzles 25.

Each of the stages 10 and 12 has at its aft end four fins 26, each of which has a hub 28 which is rotatably attached to a pair of arms 30 on the stage by a pin 32. Accordingly, the fins are movable from a folded condition flush with the body of the stage as shown in FIGS. 1 and 2 to some aerodynamic position such as 45° to the longitudinal axis of the stage. The fins can be actuated to their aerodynamic position by any suitable means such as by a piston forced aft upon firing the stage so as to cam the fins to the position.

Figure 3:
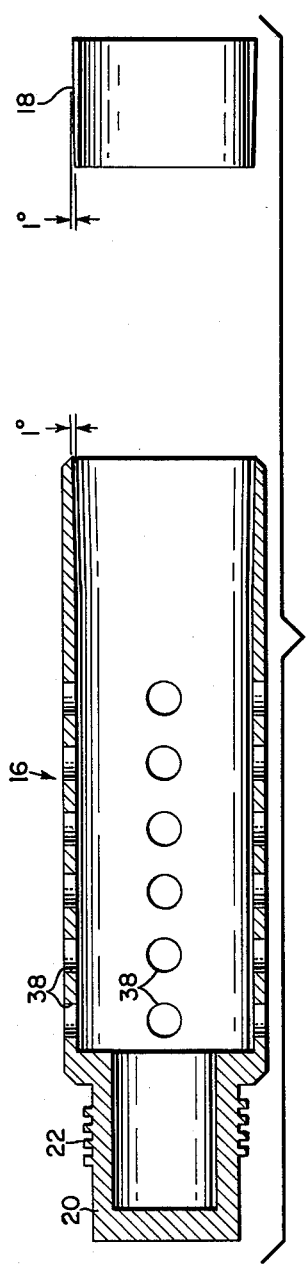
FIG. 3 is a side view of the components of the coupling with the sleeve shown in cross-section.

The forward end of the sleeve 16 has an internal diameter which is larger than a distance across the body of the stage 12 and the fins in their folded condition, so that if the sleeve 16 were slipped over the body and the fins in their folded condition there would be a space therebetween. The ring 18 is split in half and is of such a size so as to encompass the fins in their folded condition and fit into the space between the body and the sleeve 16. Since the purpose of the ring 18 is to act as a wedge between the body and the sleeve 16, the ring is provided with a slight external taper as shown in FIG. 3. While it is not necessary, the right end of the sleeve 16 as shown in FIG. 3 can be provided with an internal taper substantially equal to the taper of the ring 18. It has been found that a taper of 1° for both the sleeve and the ring has been very satisfactory. It has also been found satisfactory to make the halves of the ring 18 actually a little less than a complete half so that upon assembly the so called halves do not quite engage each other. In this way, a good wedging action can be ensured.

In order to fire the second fired stage 12 after a predetermined time of operation of the first fired stage 10, a timer and battery combination 36 is provided, the timer being set for the predetermined time and the battery setting off an igniter for firing the second fired stage 12. In order to prevent any possibility of too great an explosive force at the after end of the second fired stage 12, upon its firing, a plurality of exhaust ports 38 has been provided in the sleeve 16, which will allow a portion of the force to be dissipated.

In the assembly of the missile, the aft end of the sleeve 16 is screwed into the fore end of the first fired stage 10 and then the aft end of the second fired stage 12 is inserted within the fore end of the sleeve. Then the split ring 18 is force fitted into the space between the sleeve 16 and the second fired stage 12 so as to wedge the sleeve to the latter stage. The missile is then ready for operation.

In the operation of the missile, the first fired stage 10 can be fired with the missile resting in some suitable launcher such as a tube encompassing the entire missile. Upon firing the first fired stage 10, the thrust developed forces the sleeve toward the second fired stage 12 so as to aid the wedging action of the ring 18 and maintain a good connection between the stages. After or near the completion of the operation of the first fired stage 10, the second fired stage 12 is fired and the force of the exhaust of the second stage forces the sleeve away therefrom so as to break the wedging action of the ring 18 between the sleeve 16 and the second stage. The result is that the sleeve 16, along with the first fired stage 10, is separated from the second fired stage 12, and the split ring 18 falls away by its own weight. Thereafter, the fins 26 of the second fired stage 12 are free to be actuated to their aerodynamic position, and the latter stage is in a completed operating condition.

While only a pair of stages has been shown, the coupling can be employed for joining adjacent stages of a missile having more than just two stages. The degree of wedging action of the ring between the second fired stage 12 and the sleeve 16 is, of course, a design feature and should be such that the force of the exhaust of the second fired stage 12 is sufficient to break the wedging action.

It is now readily apparent that the invention provides a simple way, employing a wedging principle, to couple adjacent stages of a missile together so that the force at the exhaust of the second fired stage can be utilized to separate the stages.

Obviously, many modifications and variations of the present invention are possible in the light of the above teachings. For instance, while the specification describes the fins 26 as being contained within the sleeve 16, the invention would work just as well where the fins were set in their aerodynamic position a little forward of the after end of the second fired stage 12, with the sleeve 16 again encompassing an after end body portion of the stage 12 and the wedging action occurring between this portion and the sleeve by the ring 18. It is therefore to be understood, that within the scope of the appended claims, the invention may be practiced otherwise than as specifically described.

I claim:

1. A missile having a forward end and an after end, comprising at least two rocket stages, wherein one of the stages is adjacent to and fired first with respect to a second fired stage, a sleeve having opposite ends, means for attaching one end of the sleeve to a forward end of the first fired stage, at least a portion of the other end of the sleeve encompassing at least a portion of the after end of the second fired stage and radially spaced therefrom, and means wedged within the space for maintaining a connection intermediate the two stages so that upon firing of said first fired stage the exhaust force therefrom is transmitted to the second stage through said means and the wedging action of said means operates to strengthen the connection, and upon firing of the second fired stage the exhaust force therefrom breaks the wedging action and separates the stages.

2. A missile as claimed in claim 1, wherein the stages and the sleeve are cylindrical, so that said space is annular and said means being a tapered circular ring which is split in two substantially equal halves along its central axis.

3. A missile as claimed in claim 1, wherein at least the second fired stage has foldable fins at its aft end and said sleeve encompassing at least a portion of these fins in a folded condition so as to retain the fins in said folded condition during the firing of the first fired stage and allow their unfolding upon firing the second fired stage.

4. A missile as claimed in claim 1, wherein each rocket stage has a motor portion which is substantially identical.

5. A coupling for joining the stages of at least a two stage rocket of the kind where one of the stages is fired before the other, each of the stages having a fore end and an aft end and a plurality of fins mounted at each aft end, which fins are actuable between an inward folded position with respect to the stage and an outward aerodynamic position; said coupling comprising a sleeve having opposite ends, means for attaching a first end of the sleeve to the fore end of the first fired stage, at least a portion of the sleeve from a second end being capable of containing the fins of the second fired stage in a folded position and when so containing being spaced from said second fired stage, wedge means capable of being located within the space for providing a wedged connection between the stages so that upon operation of said first fired stage the exhaust force therefrom is transmitted to the second fired stage through said means and the wedging action of said means being such that upon firing the first fired stage the exhaust force therefrom breaks the wedging action and separates the stages, whereby upon said releasing the fins are freed from containment so that they can be actuated to their aerodynamic position.

6. A coupling as claimed in claim 5 wherein each of said stages has a body and wherein the means for releasably attaching the sleeve end to the second fired stage includes the portion of the sleeve capable of containing the fins also capable of containing a portion of the aft end of the second fired stage, said space being between said portion of the sleeve and said portion of the body and said wedge means being insertable within said space for wedging the sleeve against the body.

7. A coupling as claimed in claim 6 wherein said portion of the sleeve is tapered toward its released end so that said space converges toward said released end.

8. A coupling as claimed in claim 7 wherein the wedge means is a tubular collar and is split substantially in half axially to facilitate assembly.

9. A coupling as claimed in claim 8 wherein the wedge means has the same taper as the sleeve and mates therewith.

10. A coupling as claimed in claim 9 wherein said sleeve has exhaust ports capable of being open to the exterior of the rocket.

References Cited by the Examiner

UNITED STATES PATENTS

| | | | |
|---|---|---|---|
| 2,421,752 | 6/47 | Jones | 102—50 X |
| 2,996,317 | 8/61 | Kibbie et al. | 285—421 X |
| 2,998,269 | 8/61 | Houghton | 285—421 X |
| 3,029,734 | 4/62 | Allenson | 102—50 X |

SAMUEL FEINBERG, *Primary Examiner.*

SAMUEL BOYD, SAMUEL W. ENGLE, *Examiners.*